United States Patent [19]
Timson et al.

[11] Patent Number: 6,041,412
[45] Date of Patent: Mar. 21, 2000

[54] APPARATUS AND METHOD FOR PROVIDING ACCESS TO SECURED DATA OR AREA

[75] Inventors: Colin J. Timson; Chas Hock Eng Yap; Sean Kelly, all of Bristol, United Kingdom

[73] Assignee: TL Technology Rerearch (M) SDN. BHD., Kuala Lumpar, Malaysia

[21] Appl. No.: 08/970,689

[22] Filed: Nov. 14, 1997

[51] Int. Cl.$^7$ ........................... G06F 12/14
[52] U.S. Cl. .................. 713/200; 713/180; 713/186
[58] Field of Search .................. 713/200, 201, 713/176, 180, 186; 380/21, 23, 24, 25, 30, 201, 239

[56] References Cited

U.S. PATENT DOCUMENTS

| | | | |
|---|---|---|---|
| 3,632,988 | 1/1972 | Yamawaki et al. | 340/825.33 |
| 5,307,411 | 4/1994 | Anvret et al. | 380/25 |
| 5,461,217 | 10/1995 | Claus | 380/21 |
| 5,768,382 | 6/1998 | Schneiler et al. | 380/251 |
| 5,949,876 | 9/1999 | Ginter et al. | 380/4 |
| 5,949,880 | 9/1999 | Curry et al. | 380/24 |

Primary Examiner—Robert W. Beausoliel, Jr.
Assistant Examiner—Pierre Eddy Elisca
Attorney, Agent, or Firm—Milde, Hoffberg & Macklin, LLP

[57] ABSTRACT

An apparatus and a method for providing access to a secured data or area includes at least two secure data modules which contain security data and other information and which belong to a particular security scheme and a dual module reader for reading data and permissions instructions contained on the secure data modules. The two secure data modules include an enabling module and an interrogatable module. The interrogatable module and the enabling module communicate with each other via a dual module reader. Communication between the two modules is allowed as long as the two modules are members of the same security scheme. A scheme is defined by suitable proprietary encryption keys for enabling communication and data transfer between the two modules belonging to a common scheme and for preventing communication and data transfer between two modules belonging to different schemes. The communication between the two modules provides an improved data security and access control system which eliminates the need for multiple passwords for various operations and also prevents problems associated with conventional access cards which are used in conjunction with passwords.

11 Claims, 7 Drawing Sheets

APPARATUS AND METHOD FOR PROVIDING ACCESS TO SECURED DATA OR AREA

1. FIELD OF THE INVENTION

The present invention pertains to an apparatus and a method for providing access to secured data or area, in particular, to an apparatus and a method for providing access to secured data or area wherein access to secured data or secured areas is controlled by secure data modules or cards in conjunction with a security scheme.

2. BACKGROUND OF THE INVENTION

Methods of protecting real and virtual property have become increasingly sophisticated in recent times. Microprocessors, biometrics data and advanced encryption techniques are being utilized in various forms and combinations so as to take precautions for ensuring that access to secure data and areas are restricted only to those individuals who have a legitimate right of entry or access. Unfortunately, these precautions often tend to be nullified or rendered useless by the human element.

The use of biometrics data as a reliable verification tool presents a great deal of problems. Many biometrics systems still rely on the presentation of passwords or PIN codes as proof of an individual's identity. The utilization of passwords and PIN codes, which are prone to misappropriation and forgetfulness, create weaknesses in such systems. People are prone to forget passwords, to make them obvious by selecting common or easily deciphered passwords or personal identification numbers (PINs), or to divulge passwords or PINs to other people.

Sophisticated security mechanisms are typically vulnerable to human error in situations when an essential element of the security system, such as a password, is held or utilized in a highly unregulated or careless manner. One need only consider the manner in which individuals select or remember their passwords and PINs in order to appreciate this point.

A further problem with passwords is that they are simple entities. As a means for providing conditional access to secured facilities having a hierarchy of security levels, passwords have obvious deficiencies. Typically, secured facilities require the storage of databases within the memory of a host computer system which contains permission data and controls access to the databases.

In instances when access to data which is held on a "smart" card or other data storage device is required, the database would need to reside in a card reader or other memory device reader which is connected to the computer system. The security weaknesses of these systems are clearly apparent to those skilled in the computer and information systems fields.

Notwithstanding the deficiencies and shortcomings of the utilization of passwords, the password concept still facilitates the provision of secured data for a large and diverse group of individuals or other entities. In this regard, it would appear that the password scheme for providing data access and security should be further isolated from the human element so that passwords and other related data may be stored consistently and in a secured manner. It would also be desirable if the password scheme could be adapted to a security scheme which could accommodate large hierarchies of users and data access requirements without requiring the use of multiple passwords or any passwords at all.

SUMMARY OF THE INVENTION

The preferred embodiments of the present invention overcome the problems of the prior art by providing a much more reliable and tamper-proof security system for providing authorized access to secured data or areas and preventing unauthorized access to secured data or areas.

In addition, the preferred embodiments of the present invention provide an improved data security and access control system which eliminates the need for multiple passwords for various operations and also prevents problems associated with conventional access cards which are generated and used in conjunction with passwords.

The preferred embodiments of the present invention overcome the problems of the prior art by providing an apparatus and a method for providing access to secured data or area using at least two secure data modules which contain security data and other information and which belong to a particular security scheme, and a dual module reader for reading data and permissions instructions contained on the secure data modules. The two secure data modules include an enabling module and an interrogatable module. The enabling module is preferably embodied in one of a plurality of media such as a data card (either contact or contactless type), a silicon chip or other suitable data storage device and is preferably contained in a module reader for reading an interrogatable module. Similarly, the interrogatable module may be embodied in the form of a data card or may also be in the form of a silicon chip or other suitable data storage device.

The interrogatable module and the enabling module communicate with each other via a dual module reader. Communication between the two modules is allowed as long as the two modules are members of the same security scheme. A scheme is defined by suitable proprietary encryption keys for enabling communication and data transfer between the two modules belonging to a common scheme and for preventing communication and data transfer between two modules belonging to different schemes.

The enabling modules preferably contain data, which may be encrypted, which defines permissions. The permissions defined by the data stored on the enabling module determines whether the module or card reader which is either contained in or operatively connected to the enabling module which is attempting to communicate with an interrogatable module can perform one or more of a plurality of data operations such as creating data, deleting data, reading data, writing data, and various other data functions to data contained on the interrogatable module.

The interrogatable module may preferably comprise a multi-application data card having any of a plurality of different types of data including personal identification data such as fingerprint data, three-dimensional facial image data, retina scan data; personal information such as name, address, marital status, etc.; financial and banking information; personal medical information; passport related information such as Visa and travel information; insurance information and any other suitable information relating to a user or holder of the interrogatable module. This data is preferably encrypted using a suitable data encryption keys which belong to a desired security scheme.

The communication between the enabling module and the interrogatable module occurs in a dual module reader apparatus as follows. The dual module reader apparatus preferably includes an interrogatable module reader and an enabling module reader. The interrogatable module is either physically inserted into the dual module reader or brought into contactless communication with the dual module reader. The enabling module reader either contains the enabling module or is operatively connected, for example via a network connection, to the enabling module.

Initially, there is a "handshake" procedure by which the dual module reader determines whether the enabling card and interrogatable card can interface or communicate. The ability to interface is determined based on whether the enabling module and the interrogatable module belong to the same security scheme defined by encryption keys.

After the initial handshake is successful, the interrogatable module and interrogatable module reader transmits a challenge to the enabling module via the enabling module reader to determine whether the enabling module is authorized to perform data operations to the data contained on the interrogatable module. The ability of the enabling module and enabling module reader to perform the requested data operations on the interrogatable module is not determined based on entry of passwords as in the prior art but instead is determined in an isolated manner by the set of permissions contained in the enabling module. That is, in response to the challenge from the interrogatable module transmitted via the enabling module reader, the enabling module issues a response via the enabling module reader to the interrogatable module reader informing that reader whether the enabling module has permission to perform data operations on the interrogatable module data.

If it is determined that the enabling module does not have the appropriate permissions to perform data operations on the interrogatable module data, the response from the enabling module is negative and no data communication is allowed.

In contrast, if the enabling module does have appropriate permissions to perform the requested data operations on the interrogatable module data, the enabling module and the enabling module reader send a challenge to the interrogatable module to determine if the holder of the interrogatable module has appropriate authority to conduct the requested data operations on that particular interrogatable module. The determination of whether the holder of the interrogatable module is authorized to use the interrogatable module and conduct data operations is preferably determined by matching personal biometrics identification data contained on the interrogatable module with actual personal biometrics data obtained by the dual module reader from the holder of the interrogatable module at the time that such communication is attempted. This matching of stored and actual personal biometrics data can be done via a suitable biometrics data collection device such as a facial image recognition system, a palm or fingerprint scanner, a retina scanner or other suitable biometrics data collection and comparison device. Alternatively, the determination of whether a holder of the interrogatable module has authority to conduct data operations on that card may also be done via a conventional password challenge and response exchange.

After the authority of the holder of the interrogatable module has been established, the enabling module reader and enabling module will issue a request for data to the interrogatable module to determine if the data which is contained on the interrogatable module and which is required to perform the data operation requested by the holder of the interrogatable module can be accessed by the enabling module. That is, any particular data record or any entire data set of data records may be unaccessible to the particular enabling module because the permissions contained on the enabling module do not allow the enabling module to access such data records or data sets. The interrogatable module will respond to the request from the enabling module by issuing a challenge to the enabling module via the enabling module reader to determine whether the permissions stored on the enabling module allow the enabling module to access the requested data stored on the interrogatable module. The enabling module may respond to the challenge from the interrogatable module by transmitting the permissions data indicating that the enabling module is authorized to access the requested data from the interrogatable module. If the enabling module does not provide the necessary permissions data in the form of a response to the challenge, the interrogatable module reader and interrogatable module prevent the requested data from being accessed by the enabling module and enabling module reader.

Each of the challenges and responses described above embodying the communication between the enabling module and the interrogatable module are preferably encrypted according to an encryption scheme which is unique to a particular security scheme to which both the enabling module and interrogatable module must belong in order to communicate with each other. It is preferred that each security scheme have identification numbers which are unique within high degrees of statistical certainty. This unique scheme is used as a secret component in a data communication attempt between the enabling module and the interrogatable module to generate a one-time session key for that particular communication attempt. Challenges and responses during the particular communication attempt are encrypted with the unique session key and therefore allows only modules belonging to the same scheme to decrypt the messages.

A security scheme is set up via a controller module or card. When initially setting up a security scheme, the controller card is programmed to have data or permissions which authorize all data operations. These permissions are not typical passwords, but rather, are much more sophisticated and flexible data structures which are stored on the secure data modules. Each permission can authorize the access or other data operation to a data set or data record stored on a secure data module. Further, each permission may or may not be conferred to other secure data modules.

In a preferred embodiment of the present invention, the desired set of data operations includes:

1. Initiate secure data module
2. Create Data Set
3. Delete Data Set
4. Create Data Record
5. Delete Data Record
6. Read Data Record
7. Write Data Record
8. Change Record Attributes Other data operations may be added or deleted to a particular security scheme as desired.

This data is stored on the controller module using a suitable desired encryption scheme which is implemented using a plurality of encryption keys.

After storing data on the controller module, other types of modules such as enabling modules and interrogatable modules can be made from the controller module. That is, the controller module can grant permissions to other modules or cards by writing permissions data to the module to make it an enabling card. Permissions data can also be written from the controller module or an enabling module to an interrogatable module. In this manner, hierarchical sets of permissions for data operations can be written to the modules. However, an enabling module cannot empower another module with more permission than the enabling module itself contains.

According to one of the preferred embodiments of the present invention, the above-described security schemes and permissions data for enabling any of the data operations described above can be implemented using suitable proprietary software and conventional hardware. That is, the data operations implemented via a secure data module system including a dual module reader is preferably implemented and carried out via software programs executed on suitable computers and central processing units.

In a preferred embodiment of the present invention, a security scheme is established and controlled via a central processing unit (CPU) which provides control over the apparatus for providing access to secured data or area according to the present invention. More specifically, the CPU may preferably include a read only memory device (ROM) and a random access memory (RAM) device which are connected to the CPU and which store data and software necessary for apparatus operation. The apparatus also preferably includes a user input device for facilitating the user input of data and commands required for communication between the secure data modules of the dual secure data module system. The apparatus also preferably includes a display device for providing a visual display of the status of apparatus operation to a user. The ROM, RAM, user input device and display device are operatively connected to the CPU.

The apparatus also preferably includes an output device which is connected to the CPU. The output device may preferably be in the form of a computer monitor or other suitable display or printing device for displaying an operation of the apparatus for viewing by the user.

The apparatus also comprises a database stored in CPU memory such as ferroelectric random access memory, DRAM, SRAM, flash memory or other suitable memory devices. The database preferably includes data and information necessary for apparatus operation including proprietary software.

The apparatus also comprises a dual secure data module reader including at least two dual module readers for reading data contained on secure data modules such as an enabling module and an interrogatable module. The two secure data module readers of the dual secure data module are connected to the CPU. One reader is preferably adapted to read an interrogatable module while the other module reader is preferably adapted to read an enabling module.

The secure data module readers of the dual module reader each preferably comprises a central processing unit (reader CPU) for controlling the operation of the respective module reader. The module readers also preferably include a data reading device which is connected to and controlled by the reader CPU, a transmitter for transmitting data to a secure data module, which is inserted into the module reader, as well as a receiver for receiving data from the inserted secure data module. The transmitter and receiver are connected to the reader CPU. The module readers also comprise a memory for storing data and information including software required for the operation of the reader CPU.

The secure data modules may be in the form of cards. Such cards may include a central processing unit (card CPU) for controlling the operation of the data card. The data cards may also include a reading device which is connected to and controlled by the card CPU, a transmitter for transmitting data to the corresponding secure data module or card reader and a receiver for receiving data from the corresponding secure data module or card reader. The transmitter and receiver are operatively connected to the card CPU. The data cards may also comprise a memory such as FRAM, DRAM, SRAM, flash memory or other suitable memory devices for storing data and information. The secure data modules in the form of data cards operate in conjunction with the module or card readers of the dual secure data module reader in a manner which will be described herein.

In conventional information and other data systems, access to various parts or portions of a physical or virtual area often involves the entry of multiple passwords. A more privileged user would be required to present more passwords to access a system. By utilizing the normal functionality of an enabling module, it is comparatively easy to set up and operate very sophisticated hierarchical structures in order to provide an almost limitless range of access permissions.

In the preferred embodiments of the present invention, all secure data modules or cards are defined so as to belong to a "scheme". Only cards within the same scheme may interact with one another. New schemes may be created from a blank data card by the introduction and storage of a plurality of defined "guardian keys" preferably in the form of encryption scheme data for implementing a desired encryption scheme. These keys are used to convert a blank data card into a controller card. Controller cards contain a full set of permissions and are thus capable of performing any task on any other data card within the same scheme. Any number of controller cards may be created provided that they are programmed with the same guardian keys and with the keys entered in the same order. All messages which are transferred between data cards are encrypted, so that only data cards of the same scheme will be capable of understanding each other's messages.

The apparatus and method of the present invention provides security on a number of levels. Scheme data cards and/or secure data modules are selected and programmed to be mutually exclusive through associated encryption procedures described above. The data sets and data records, which are utilized, are protected by their differing identifications. Lastly, data sets and data records can be provided with features so as to inhibit certain data operations which may be performed thereon. That is, data sets and data records may have attributes which prevent one of the data operations such as delete data, write data, read data, create data, etc. from being performed thereto.

The apparatus and method of the preferred embodiments of the present invention may also be used in a network environment. In such a network environment, the apparatus or system comprises a server computer which is incorporated in a network configuration along with any suitable number of remote systems. When used in a network environment, the server computer services the remote systems via a suitable communication network.

The preferred embodiments of the present invention is applicable to any number of systems or environments involving access to secured data or areas. For example, the preferred embodiments of the present invention may be utilized in a system for controlling access to automated teller machine (ATM) accounts, financial records, government records, national and international borders, welfare systems, driving records, medical or hospital records, building access, sporting events, personal or network computers or any system for providing access to secured data or areas.

These and other elements, features, and advantages of the preferred embodiments of the present invention will be apparent from the following detailed description of the preferred embodiments of the present invention, as illustrated in the accompanying drawings.

DETAILED DESCRIPTION OF PREFERRED EMBODIMENTS

Figure 1:
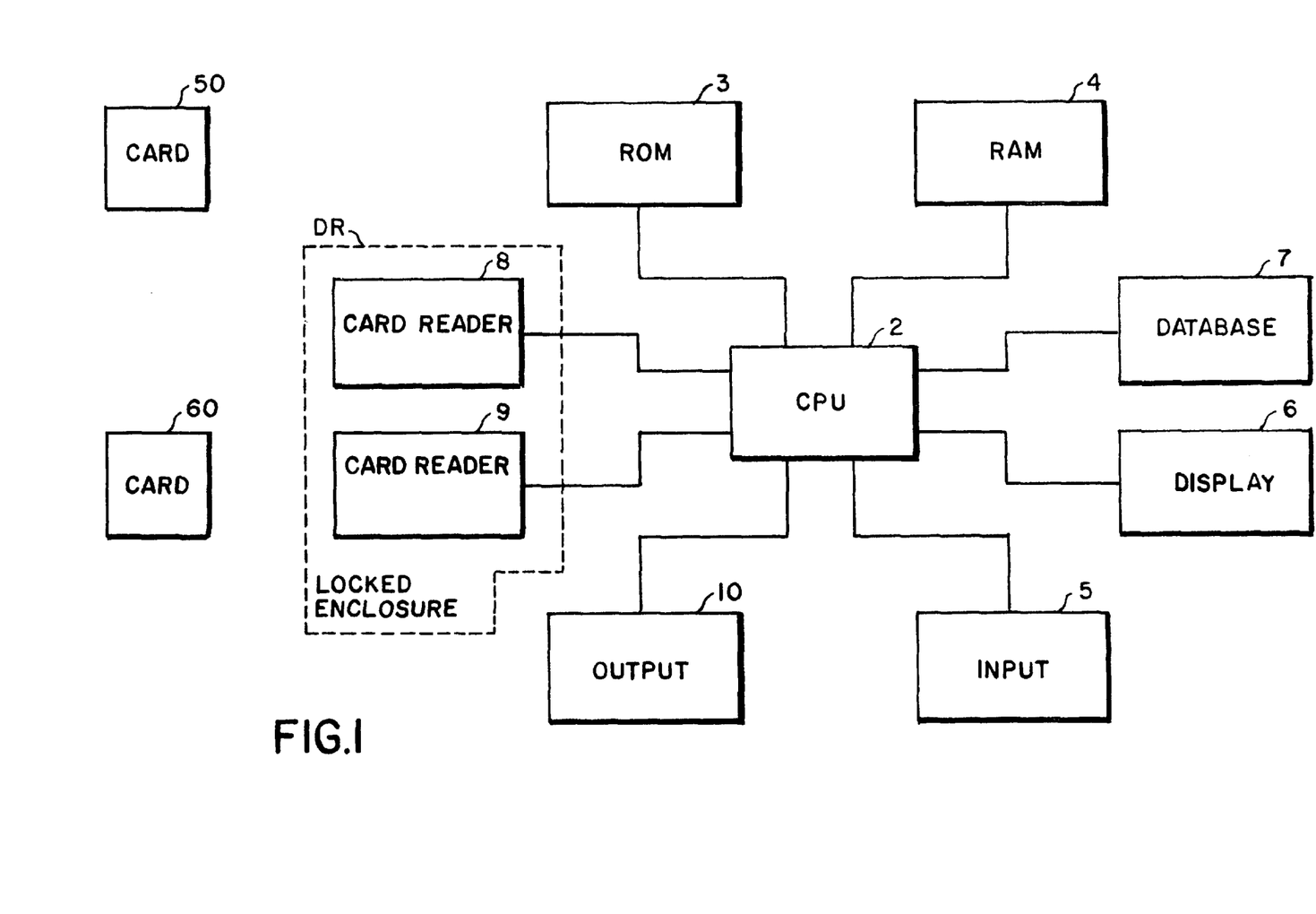
FIG. 1 illustrates a preferred embodiment of the present invention in block diagram form.

FIG. 1 illustrates, in block diagram form, of a preferred embodiment of an apparatus of the present invention which is designated by the reference numeral 1. With reference to FIG. 1, this preferred embodiment of the apparatus 1 comprises a central processing unit (CPU) 2 which provides control over the operations of the elements of the apparatus 1 shown in FIG. 1. The CPU 2, is preferably a microprocessor. However, it is important to note that the CPU 2 may also be implemented with a mini-computer, a micro-computer, a workstation or a mainframe computer.

The apparatus 1 also preferably includes a read only memory (ROM) device 3 and a random access memory (RAM) device 4 which are operatively connected to the CPU 2 and which store data and software necessary for controlling and executing apparatus operations. The apparatus 1 also comprises a user input device 5 for facilitating the user input of data and commands. The apparatus 1 also comprises an output device preferably in the form of a display device 6 for providing a visual display of the status of operation to a user. The ROM 3, RAM 4, user input device 5 and display device 6 are operatively connected to the CPU 2. The apparatus 1 also comprises a database 7 which comprises all necessary data which is pertinent to apparatus operation.

The apparatus 1 also includes a dual secure data module reader DR which preferably includes two secured data module or card readers 8 and 9. In the preferred embodiment shown in FIG. 1, the first reader 8 is preferably a "contactless" reader and the second reader 9 is preferably a "contact" type reader. The details of the contactless reader and contact reader and related contactless and contact type data communication protocols are well known and will not be repeated.

The readers 8 and 9 are preferably operatively connected to and controlled by the CPU 2. The card readers 8 and 9 may be individual readers which are remotely connected to each other or they may be readers of an integrated dual module reader unit DR. As will be described in more detail below, the reader 8 is preferably adapted to read "interrogable" modules or cards and the reader 9 is adapted to read "enabling" modules or cards. In the preferred embodiment of FIG. 1, the interrogatable module reader 8 is a publicly accessible reader and the enabling reader 9 is under the supervision and protection of the apparatus operator or system manager.

Module or card readers 8 and 9 may also be combined into a single physical housing to form the integral unit DR. Reader 8, being a "contactless" reader, provides optimal public interface capabilities (i.e. easy to use, immune from impurities, vandalproof). Module or card reader 9 is preferably located in a secure (locked) enclosure within a housing. Card reader 9, being a "contact" reader, provides optimal mechanical connections with the enabling card which may be fixed for a certain duration or application, so as to prevent unwanted movement inside the card reader.

It is important to note that the enabling module may be contained inside the reader 9 so as to be a permanent fixture therein. In such an embodiment, the enabling module is preferably contained in a suitable physical memory device such as a silicon chip located within the reader 9. It is also important to note that the enabling module and/or the interrogatable module could also be implemented as a computer chip or unit of hardware which is operatively connected to the reader 8 or 9 or analogous device.

Communication with the secure data modules, whether of the contactless or the contact variety is preferably performed according to internationally defined standards (i.e. ISO 7816). The use of these standards facilitates alternative sourcing of both the module or card reader and the secure data module technology.

The apparatus 1 may also comprise an output device 10 which is connected to the CPU 2. In the preferred embodiment of FIG. 1 the output device 10 may comprise a printer for obtaining a printed copy of information obtained from the apparatus 1.

Figure 2:
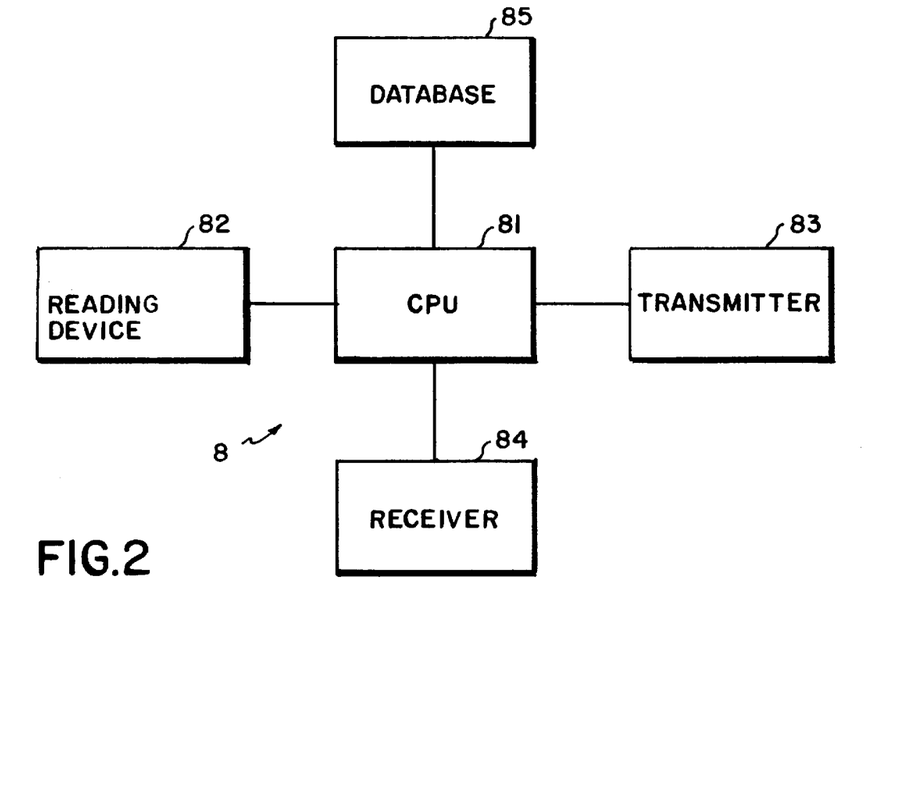
FIG. 2 illustrates a first secure data module reader of the apparatus of FIG. 1 in block diagram form.

FIG. 2 illustrates a block diagram of a preferred embodiment of the secure data module reader 8. The reader 8 preferably includes a central processing unit (reader CPU) 81 for controlling the operation of the reader 8. The reader 8 also preferably includes a conventional "contactless" reading device 82 which is operatively connected to and controlled by the reader CPU 81. The card reader 8 also preferably includes a transmitter 83 for transmitting data to an inserted secure data module or card as well as a receiver 84 for receiving data from the inserted data module or card. The transmitter 83 and receiver 84 are operatively connected to the reader CPU 81. The reader 8 also comprises a database 85 for storing all data and information pertinent to the application for which the data card is utilized including software for operating the reader 8. The reader 8 is adapted to communicate with a first secure data module or card 50, which is also shown in FIG. 1. In the preferred embodiment of FIG. 1, the card 50 is preferably an interrogatable card.

Figure 3:
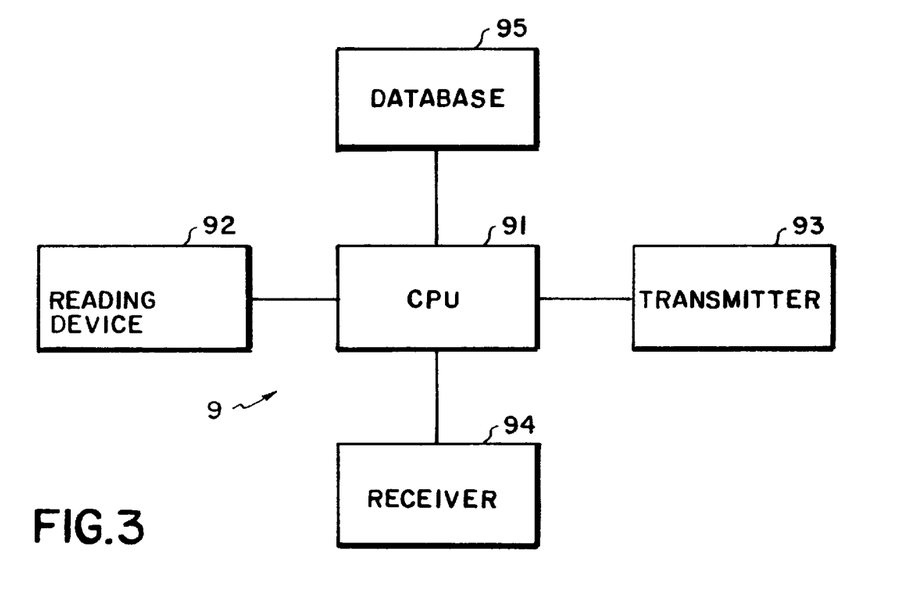
FIG. 3 illustrates a second secure data module reader of the apparatus of FIG. 1 in block diagram form.

FIG. 3 illustrates a block diagram of the second reader 9 of the dual secure data module reader DR shown in FIG. 1.

The reader 9 preferably includes a central processing unit (reading CPU) 91 for controlling the operation of the reader 9. The reader 9 also preferably includes a conventional "contact" reading device 92 which is connected to and controlled by the reader CPU 91. The reader 9 also includes a transmitter 93 for transmitting data to an inserted data module or card and a receiver 94 for receiving data from the inserted data module or card. The transmitter 93 and receiver 94 are operatively connected to the reader CPU 91. The card reader 9 also comprises a database 95 for storing all data and information pertinent to the application for which the data card is utilized including proprietary software for operation of the reader 9. The reader 9 is preferably adapted to communicate with a second secure data module or card 60 which is shown in FIG. 1. In the preferred embodiment of FIG. 1, the card 60 is preferably an enabling module or card.

Figure 4:
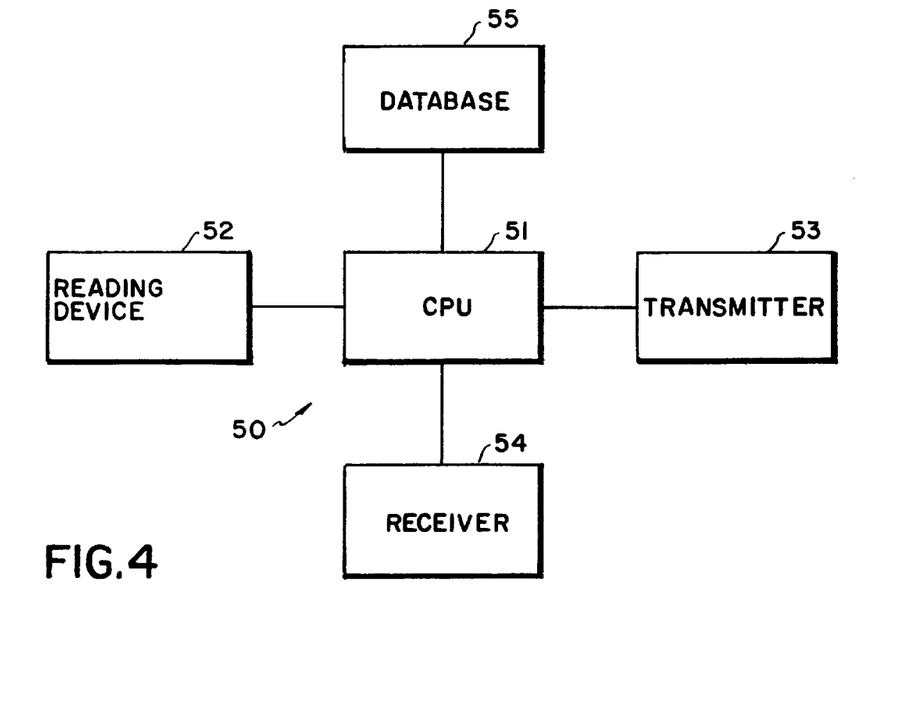
FIG. 4 illustrates a first secure data module which is utilized in conjunction with the apparatus of FIG. 1 in block diagram form.

FIG. 4 illustrates a block diagram of a preferred embodiment of the secure data module or card 50. The data card 50 preferably operates in conjunction with the card reader 8. The data card 50 comprises a central processing unit (card CPU) 51 preferably in the form of a microcontroller or other suitable device for controlling the operation of the data card 50. The data card 50 also preferably includes a contactless reading device 52 which is operatively connected to and controlled by the CPU 51. The data card 50 also includes a transmitter 53 for transmitting data to the reader 8 and a receiver 54 for receiving data from the reader 8. The transmitter 53 and the receiver 54 are operatively connected to the CPU 51. The data card 50 also includes a database 55 for storing data and information including software required for controlling operation of the card 50.

Figure 5:
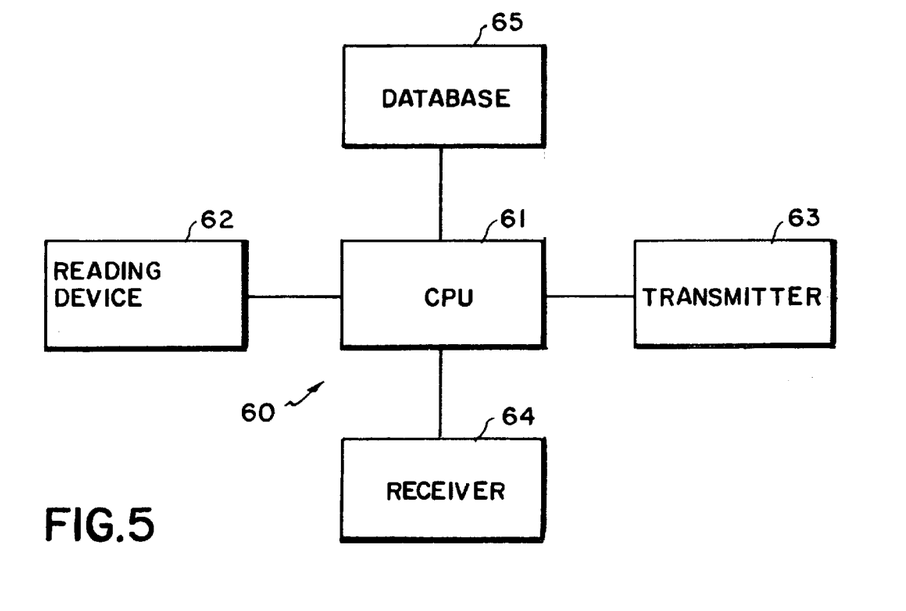
FIG. 5 illustrates a second secure data module which is utilized in conjunction with the apparatus of FIG. 1 in block diagram form.

FIG. 5 illustrates a block diagram of a preferred embodiment of the secure data module or card 60. The data card 60 operates in conjunction with the reader 9. The data card 60 preferably includes a central processing unit (card CPU) 61 preferably in the form of a microcontroller or other suitable device for controlling the operation of the data card 60. The data card 60 also preferably includes a "contact" reading device 62 which is connected to and controlled by the CPU 61. The data card 60 also includes a transmitter 63 for transmitting data to the card reader 9 and a receiver 64 for receiving data from the card reader 9. The transmitter 63 and the receiver 64 are operatively connected to the CPU 61. The data card 60 also comprises a database 65 for storing data and information including software required to operate the card or module 60.

While at least one of the preferred embodiments of the present invention is described as utilizing secure data cards, it is important to note that any suitable device or object which can store data and/or information may be utilized in conjunction with preferred embodiments of the present invention. Such data cards, devices and/or objects may be referred to individually as a "secure data module" or "SDM".

The preferred embodiments of the present invention using the structure shown in FIGS. 1–5 preferably provides an apparatus and a method which controls access to secured data or areas which provides a unique degree of security and flexibility using a dual secure data module system including enabling modules and interrogatable modules and associated security scheme.

In the dual secure data module system of the preferred embodiments of the present invention, the secure data modules 50 or 60 contain data which are defined as "authorizations" which are utilized to gain "permission" to access and to perform data operations on data contained on other secure data modules or cards. These authorizations are not typical passwords, but rather, are much more sophisticated and flexible data structures which are preferably in the form of encrypted data sets for allowing each of a plurality of data operations. These data structures and/or entities are defined as "permissions".

Each permission can authorize access to a data set or data record stored on a secure data module or card. Further, each permission may or may not be conferred to another secure data module or card. The secure data modules or cards which grant permissions are enabling modules or cards and function essentially as "keys" in the traditional sense so as to open or allow a particular access or data operation requested. The secure data modules upon which data operations are to be performed are interrogable modules or cards which are referred to above.

Interrogatable modules or cards store data in certain secure areas of memory on such cards. These secure areas have "locks" which may be set or left open depending upon the application requirements. The locks preferably take the form of encrypted data sets or data records which can only be accessed by a permission having an appropriate "$^1$key" or decryption code for unlocking each of the locked data sets or data records.

In the dual secure data module scheme of the preferred embodiments of the present invention, data operations which require permissions can only be performed in a dual secure data module reader wherein both an enabling module and an interrogated module are utilized. In data operations where no permission is required, a single module or card reader will suffice. When utilized in conjunction with automatic doors or vending machines, the enabling card could be embedded in the hardware of the apparatus 1. In this manner, the enabling card may only be accessible to maintenance personnel.

Since permissions are stored on the secure data modules or cards, the functionality of the data cards can be utilized so as to enhance and to extend the capabilities of the entire security system. Further, an enabling card contains a range of permissions, defined herein as a "Permission Set" and may copy a subset of its permissions onto other data cards of the same scheme. In this manner, it is possible to generate from one enabling card other enabling cards having any combination of permissions of the original enabling card. An enabling card is typically provided with the permissions required for carrying out an application. Powerful enabling cards can be utilized to create less powerful enabling cards so that an entire hierarchy of such data cards can be created to suit any security system.

In conventional security systems which are organized in a hierarchical manner, access to various portions of a physical or virtual area often entails the entry of multiple passwords. Thus, a more privileged user would be required to present a greater number of passwords. However, by utilizing the normal functionality of an enabling card, it becomes comparatively easy to set up and operate very sophisticated hierarchical structures so as to provide an almost limitless range of access permissions.

In the preferred embodiments of the present invention, all secure data modules or cards are programmed to belong to a "scheme". A scheme is a function of a number of keys which are defined as "guardian keys" which are preferably in the form of data encryption keys. Only data cards within the same scheme may work. New schemes are created from blank data cards by the introduction and storage thereon of a plurality of the above defined guardian keys. These keys may also be utilized to convert a blank data card into a controller card which contains a full set of permissions and are therefore, capable of performing any task on any other data card within the same scheme. Controller cards may even promote blank cards to become members of the controller's own scheme thereby creating "raw data cards" which are ready to receive permissions or other data to become enabling cards or interrogatable cards.

Any number of controller cards may be created, but only upon being programmed with the same guardian keys and in the same order. All messages which are transferred between data cards are encrypted so that only data cards of the same scheme will be able to understand the messages of the other data cards.

The above-identified system of controller cards, enabling cards and interrogatable cards is implemented using suitable proprietary software which is executed on CPU 2 and using the dual secure data module reader DR including reader 8 and reader 9.

Figure 6:
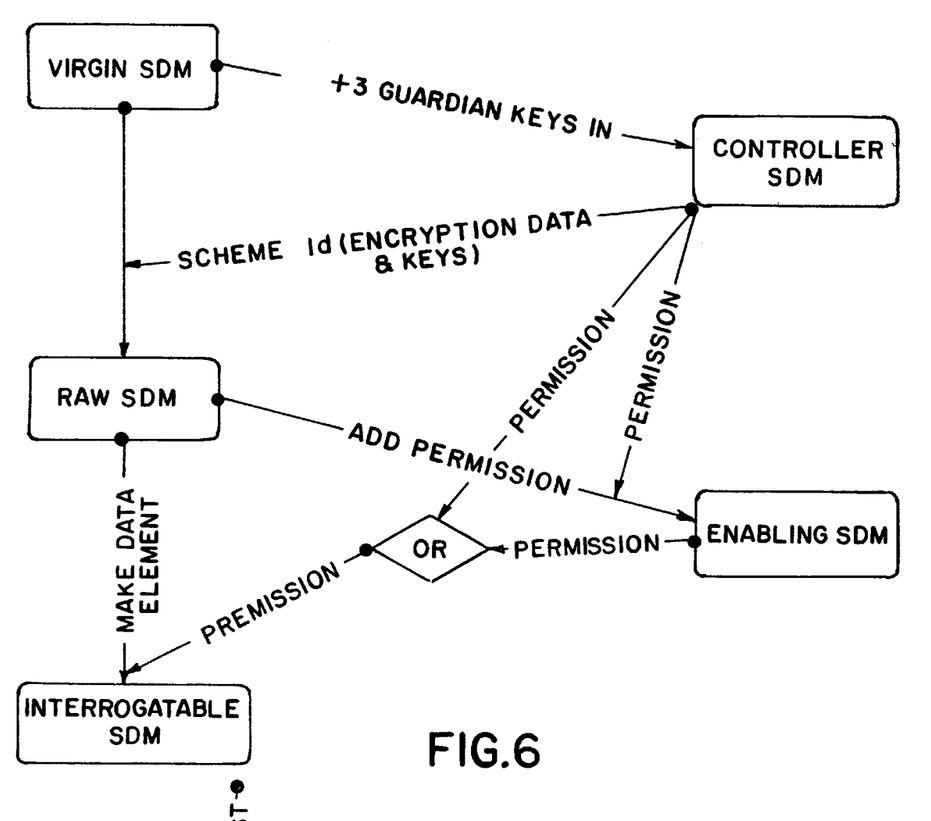
FIG. 6 illustrates a process by which secure data modules may be programmed so as to create data cards from blank cards.

FIG. 6 illustrates a process by which secure data modules or cards are programmed so as to create controller cards, raw data cards, enabling cards and interrogated cards from blank cards using the apparatus shown in FIG. 1.

As illustrated in FIG. 6, the various cards are obtained via a process of utilizing guardian keys and applying scheme identification, data elements or permissions in various combinations.

More specifically, the setting up of a security scheme and entire security system begins with a virgin SDM which is to become a controller SDM. The controller SDM is created by the program executed on CPU 2 using information from database 7 and input via input device 5. The controller SDM is set up by first recording thereon the security scheme or security or guardian keys which are preferably three in number and are recorded in a specific order which must be repeated in order to duplicate the controller SDM. The CPU 2 preferably records the appropriate guardian key data via the reader 9 to the virgin SDM to create a controller SDM. Then, the maximum level of permissions for data operations permissible in a particular security scheme are written to the virgin SDM so as to create the controller SDM.

Another secure data module, preferably in the form of a card as shown in FIGS. 3 or 4 is obtained and is a Raw SDM. The raw SDM is introduced into the security scheme of the controller SDM by the controller SDM writing the scheme identification in the form of encryption data and keys to the raw SDM. This data transfer is carried out via the dual secure data module reader DR including readers 8 and 9. Because the raw SDM does not contain any data, permissions or security scheme identification information, the controller SDM can write any data to the raw SDM.

If data sets or data records are recorded on the raw SDM via the apparatus shown in FIG. 1 including the reader 8, the raw SDM becomes an interrogatable SDM. Various permissions may be recorded on the interrogatable SDM by the controller SDM or by an enabling SDM created from the controller SDM.

If permissions but no data sets or records are recorded on the If raw SDM, the raw SDM becomes an enabling SDM which may be used to create other enabling SDMs or to grant or record permissions to interrogatable SDMs. This data operation is also performed using the dual secure data module reader DR including readers 8 and 9.

In the manner described above and using the structure shown in FIGS. 1–5, a completely hierarchical secure data system can be created and implemented in the form of a dual secure data module scheme including a security scheme which only allows data operations and communications between secure data modules belonging to a common security scheme.

The apparatus and method of the preferred embodiments of the present invention utilizes two different types of permissions.

Each permission is defined by suitable data stored on secure data module. One type of permission is the permission to perform an operation on data. The other type of permission is the permission to empower other data cards to perform a pre-defined task. With regard to the former type of permission, the data permissions relate to specific data storage areas on the data cards and to the specific operations which can be performed thereon. These data areas are defined as "data sets" and typically represent distinct types of information, such as personal details, medical history, etc. The data sets of a data card can be separate and apart from the other pre-defined data sets and can be governed by independent permissions.

There are preferably eight distinct "permissions" which can be used in at least one of the preferred embodiments of the present invention. These eight permissions are:

1. Initiate data card and/or secure data module (SDM)
2. Create Data Set
3. Delete Data Set
4. Create Data Record
5. Delete Data Record
6. Read Data Record
7. Write Data Record
8. Change Record Attributes Data permissions themselves relate directly to the 8 operations which can be performed on the data within the data card, thereby defining the circumstances under which any or all of the operations may be authorized. This method allows for flexibility and precision in the allocation of a permissions to control data operations.

Another type of permission pertains to the granting of permission to another card to become an enabling card. Once again, the granting of permission relates to specific data operations. However, a permission itself may be transferred to an interrogatable card. It is important to note that an enabling card cannot empower another card with more permissions than it contains itself.

A further enhancement of the security scheme is provided by data record attributes which are allocated on a record-by-record basis within specific data sets. In a preferred embodiment of the present invention, one attribute can be assigned for each of the commands which can operate on the data. These record level permissions effectively disable or enable the associated data access function. In this manner, it is possible to write-protect data records in a data set which has a write permission enabled. In this regard, although permissions may act on entire data sets, individual records can selectively and unilaterally disable functions which act on themselves.

The keys in the form of encryption data sets which are stored on a data card may be replaced at regular intervals during the life of the data card. Enabling cards may have a limited use period and, therefore, be rendered useless after a key has been changed. This serves to discourage people from trying to identify the keys on a data card as the keys would have been changed before an appropriate identification and deciphering could be accomplished.

An enabling card can hold stored keys so that it is capable of performing any desired application functions. An interrogated card may request to receive keys whenever it encounters a restricted access situation. The corresponding enabling card may then, via an encrypted conversation between the two data cards, deliver an appropriate permission to the interrogated card so as to grant it access to the data in question.

Figure 7:
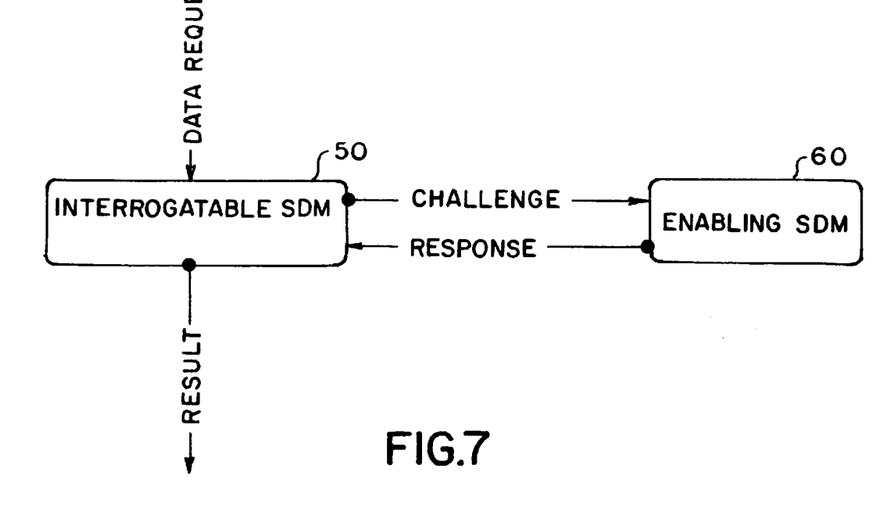
FIG. 7 illustrates the operations which occur between an interrogatable module and an enabling module which are utilized in conjunction with the preferred embodiments of the present invention.

The communication between the enabling module and the interrogatable module according to the preferred embodiments of the present invention is shown in FIG. 7. It should be noted that the communication between the enabling module and the interrogatable module shown in FIG. 7 is carried out in the dual secure data module reader DR including readers 8 and 9 and controlled by CPU 2 via appropriate software.

More specifically, an interrogatable module 50 is either physically inserted into the reader 8 of the dual module reader DR or brought into contactless communication with the reader 8. The enabling module reader 9 either contains the enabling module 60 or is operatively connected, for example via a network connection, to the enabling module 60.

Initially, there is a "handshake" procedure controlled by the CPU 2 by which the dual module reader DR determines whether the enabling module 60 and interrogatable module 50 can interface or communicate. The ability to interface is determined based on whether the enabling module 60 and the interrogatable module 50 belong to the same security scheme defined by encryption keys stored on the modules 50, 60.

After the initial handshake is successful, the interrogatable module 50 and interrogatable module reader 8 transmits a challenge to the enabling module 60 via the enabling module reader 9 to determine whether the enabling module 60 is authorized to perform data operations (preferably one of eight data operations described above) to the data contained on the interrogatable module 50. The ability of the enabling module 60 and enabling module reader 9 to perform the requested data operations on the interrogatable module 50 is not determined based on entry of passwords as in the prior art but instead is determined in an isolated manner by the set of permissions contained in the enabling module 60. That is, in response to the challenge from the interrogatable module 50 transmitted via the enabling module reader 8, the enabling module 60 issues a response via the enabling module reader 9 to the —interrogatable module reader 8 informing that reader 8 whether the enabling module 60 has permission to perform data operations on the interrogatable module data.

If it is determined that the enabling module 60 does not have the appropriate permissions to perform data operations on the interrogatable module data, the response from the enabling module 60 is negative and no data communication is allowed.

In contrast, if the enabling module 60 does have appropriate permissions to perform the requested data operations on the interrogatable module data, the enabling module 60 and the enabling module reader 9 send a challenge to the interrogatable module 50 to determine if the holder of the interrogatable module 50 has appropriate authority to conduct the requested data operations on that particular interrogatable module. The determination of whether the holder of the interrogatable module 50 is authorized to use the interrogatable module 50 and conduct data operations is preferably determined by matching personal biometrics identification data contained on the interrogatable module with actual personal biometrics data obtained by the dual module reader DR from the holder of the interrogatable module 50 at the time that such communication is attempted. This matching of stored and actual personal biometrics data can be done via a suitable biometrics data collection device such as a facial image recognition system, a palm or fingerprint scanner, a retina scanner or other suitable biometrics data collection and comparison device provided in the dual secure data module reader DR. Alternatively, the determination of whether a holder of the interrogatable module 50 has authority to conduct data operations on that card may also be done via a conventional password challenge and response exchange via the input device 5 and output device 10 or display 6.

After the authority of the holder of the interrogatable module 50 has been established, the enabling module reader 9 and enabling module 60 will issue a request for data to the interrogatable module 50 to determine if the data which is contained on the interrogatable module 50 and which is required to perform the data operation requested by the holder of the interrogatable module 50 can be accessed by the enabling module. That is, any particular data record or any entire data set of data records may be unaccessible to the particular enabling module 60 because the permissions contained on the enabling module 60 do not allow the enabling module 60 to access such data records or data sets stored on the interrogatable module 50. The interrogatable module 50 will respond to the request from the enabling module 60 by issuing a challenge to the enabling module 60 via the enabling module reader 9 to determine whether the permissions stored on the enabling module 60 allow the enabling module 60 to access the requested data stored on the interrogatable module 50. The enabling module 60 may respond to the challenge from the interrogatable module 50 by transmitting the permissions data indicating that the enabling module 60 is authorized to access the requested data from the interrogatable module 50.

If the enabling module 60 does not provide the necessary permissions data in the form of a response to the challenge, the interrogatable module reader 8 and interrogatable module 50 prevent the requested data from being accessed by the enabling module 60 and enabling module reader 9.

Each of the challenges and responses described above embodying the communication between the enabling module 60 and the interrogatable module 50 are preferably encrypted according to an encryption scheme which is unique to a particular security scheme to which both the enabling module 60 and interrogatable module 50 must belong in order to communicate with each other. It is preferred that each security scheme have identification numbers which are unique within high degrees of statistical certainty. This unique scheme is used as a secret component in a data communication attempt between the enabling module 50 and the interrogatable module 60 to generate a one-time session key for that particular communication attempt. Challenges and responses during the particular communication attempt are encrypted with the unique session key and therefore allows only modules belonging to the same scheme to decrypt the messages.

The apparatus and method of the preferred embodiments of the present invention provide for an effective and efficient system which is flexible in its application capabilities and which entails minimal overhead when compared to conventional password-based systems and methods, and particularly those involving the use of multiple passwords.

It is also important to note that the method of decrypting challenges and responses requires that all of the data cards within a particular scheme communicate in the same manner of communication and language. In this manner, secure data modules or cards from other or foreign schemes will be recognized as "foreign" cards and will be denied access to and communication with secure data modules or cards from other schemes.

The apparatus and method of the preferred embodiments of the present invention provides security on a maximum number of levels. Secure data modules or cards belonging to a particular security scheme can be selected and programmed so as to be mutually exclusive through their encryption procedures. The data sets which are utilized are protected during the challenge and response operations by their different identifications. Lastly, data records can be provided with a feature or features for preventing operations from being performed thereon.

It is also important to note that commands may be disabled individually. This property may be utilized in order to remove directory commands if the issuers of the data cards wish to keep file names and sizes confidential or secret. Further, the communications protocol for any scheme may also be variable. In this manner, one scheme may utilize a standard asynchronous protocol while another scheme could utilize a bit duty cycle coding strategy. This not only allows for the adaptation of cards to a wide range of different readers, but also indirectly provides for yet another security feature. Finally, while retaining a full compatibility with ISO 7816 part-3, the present invention serves to permit the transmission of data blocks which are greater than 256 bytes, thereby providing obvious advantages in terms of both simplicity and speed of operation.

There are many different applications and uses for the method and apparatus of the preferred embodiments of the present invention described with reference to FIGS. 1–7.

Figure 8:
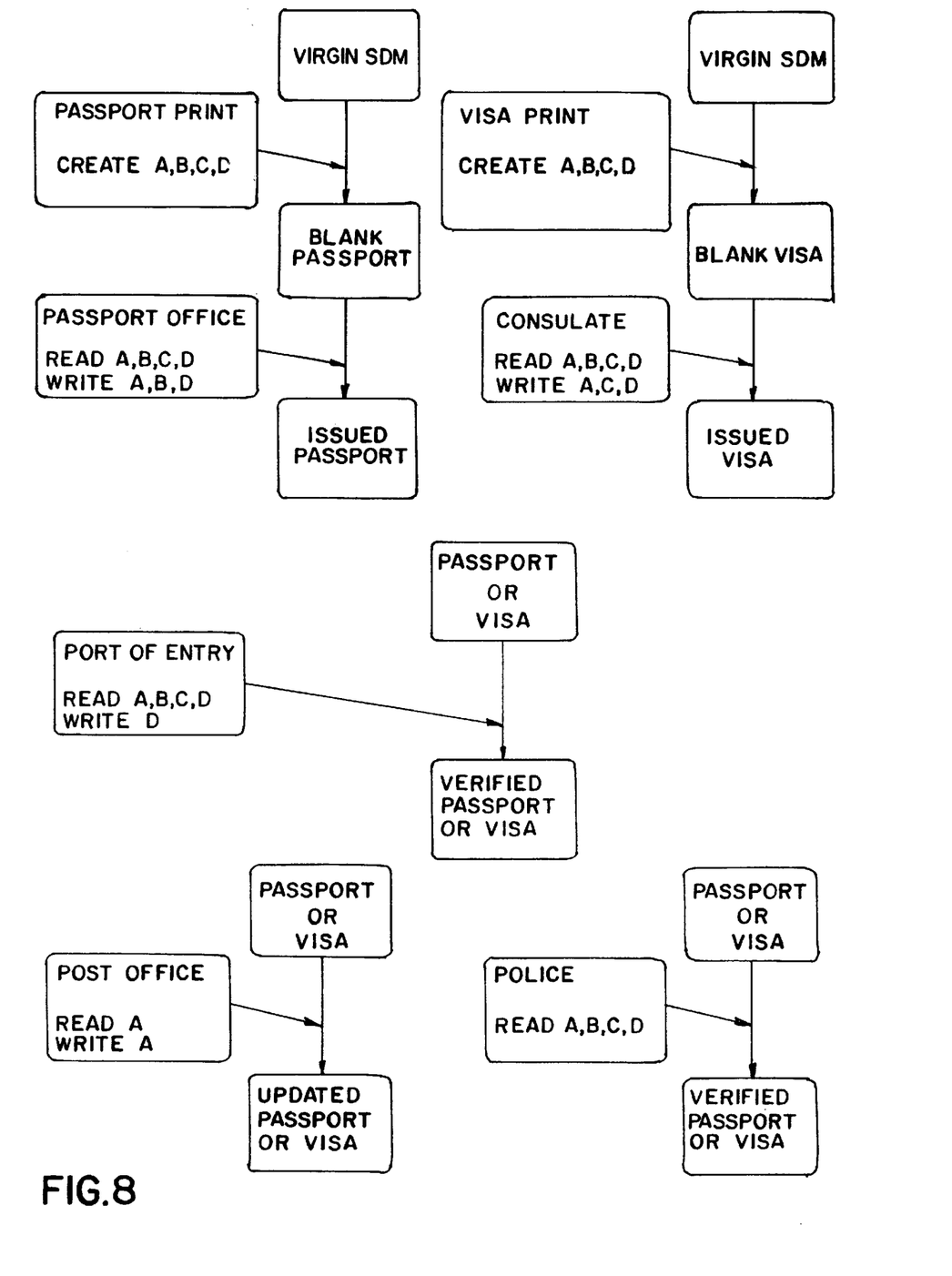
FIG. 8 illustrates a security scheme hierarchy which is utilized in conjunction with another preferred embodiment of the present invention used for passport, visa and travel document security and control.

In one preferred embodiment of an application of the apparatus and method of the present invention, a novel travel and immigration control system is provided. FIG. 8 illustrates a system for one of the preferred embodiments wherein the present invention is utilized for administering and monitoring passports, visas and other travel documents.

The system of this preferred embodiment controls security of data relating to travel and immigration of people at airports, passport offices, etc. Employees of the various organizations responsible for security and immigration control such as employees of the airports, border and immigration control, police, etc. are expected to hold one or more secure data modules or cards which are enabling cards. Travelers or users of the various organizations' services, i.e. the public, are expected to hold a secure data module which are interrogatable cards.

The enabling cards held by the organization employees are used to write, access and manage the data on the interrogatable cards which are held by members of the public. These interrogatable cards may be incorporated into passports, visas, boarding passes, luggage tags or other travel documents, and typically contain descriptions and authorizations relevant to travel and residence for the respective individual. The scope of the security scheme will preferably include all of the personnel and agencies currently engaged in the management and control of passports, visas, or other travel documents for a particular country. The scheme will also preferably incorporate all traveling residents of that country and all those who apply to the agencies of the particular country for passports, visas, travel documents or residential permits.

In order to institute such a travel and immigration control scheme, it is necessary to determine the various data sets which may be stored on a traveling individual's interrogatable card and to determine the hierarchy of the permissions relating thereto which will be implemented via and stored on agency or organization enabling cards. New data sets and permissions relating thereto may be added at any time through the use of higher order enabling cards or controller card or cards. Additional data sets may be incorporated into the scheme for future use and/or expansion.

In the immigration and travel embodiment of FIG. 8, the system will preferably operate by utilizing four data sets, identified as data sets A, B, C and D. Data set A will preferably contain a digitally stored photograph or other biometrics data of the holder of the interrogable card along with other personal identification information. Data set B will preferably contain data which relates to passports and will contain information such as that currently found in printed form on typical passports and/or other travel documents. This data may be stored in encrypted form in the microcontroller memory of the card as is seen in FIGS. 4 and 5.

Data set C will contain visa information and will be stored on the cards of those individuals applying for visa related permissions for a scheme participating country. Data set D will preferably serve as a storage area which can store commentary and/or information which can be provided by the various agencies or countries participating in the scheme.

The number, content and arrangement of the data sets will depend upon the particular application and scheme as well as upon whether a particular interrogatable card is configured for passport or for visa purposes.

As is seen in FIG. 8, post Offices may be issued enabling cards with a smaller number of permissions so that they may read and write only to data set A, so as to facilitate the changing of personal details. Consular offices, and other foreign offices, could be granted permissions to read and write to data sets A and C so that visas could be issued.

Officials at points or ports of entry, such as airports and harbors, could have the ability to read data sets A, B and C, and to write to data set D. Data set D, for example, could be utilized for recording dates and number(s) of entries, departure point(s) or any other relevant information.

The tasks of the respective officials could be facilitated by the ability of the enabling cards to respond only to queries which are directed at them by way of a scheme identifier. It would, therefore, not matter how many other cards, from different organizations, are utilized since only the relevant ones would respond to a particular scheme interrogation. In this manner, processing times and procedures can be reduced. Security officials, such as police or customs agents, might also be given authority to read and to access all of the data sets, but receive no write authorization or permission.

The organization which manages the scheme and issues the controller cards, for example in this embodiment a department of state, could require that it be given the ability to create all scheme data cards. In addition, blank data cards may be created and introduced into the scheme with the appropriate data sets being created and stored thereon. These data cards may then be passed on to the relevant passport or visa department. Enabling cards may be created with the correct combination of permissions for each department in the organization.

Countries which participate in a scheme need only exchange enabling cards so as to allow foreign countries to read their passports, visas and other travel documents.

It should be noted that the data communication and transfer operations described above with reference to FIG. 8 are preferably carried out and the security scheme and system of FIG. 8 is preferably implemented using the method and apparatus described with reference to FIGS. 1–7.

In yet another preferred embodiment of the present invention, more than one security scheme may be used so as to reduce the need to hold numerous enabling cards.

Within this database of scheme hierarchy shown in FIG. 8 which is preferably created and stored in CPU 2 and controlled thereby, a number of countries are each represented by the individual data sets. To gain access to any one of the countries, the user may be required to have an entry visa in the form of an external permission. Once this has been granted, the user can then travel within the country or access a data set corresponding thereto. However, if the user desires to gain access to a specific data record, he or she may discover that the data record is inaccessible. In this regard, simply having permission to be in the country data set will not guarantee access to every data record in that data set. If the data record is unlocked and/or rendered accessible, the user will automatically gain entry to all of the portions thereof.

The operation of the security system shown in FIG. 8 is preferably carried out according to the description of FIG. 7 and using the elements shown in FIGS. 1–7 as described above.

Figure 9:
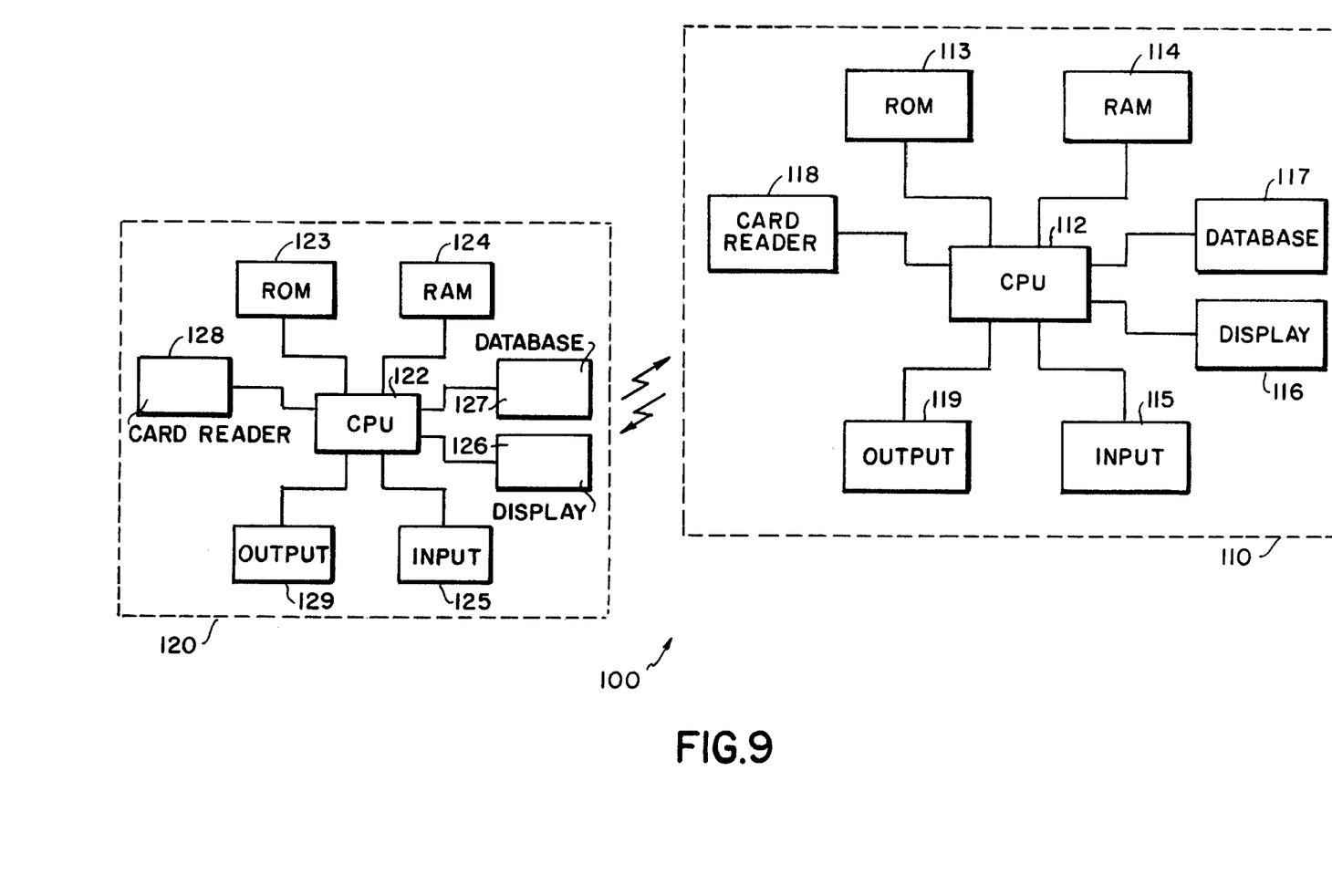
FIG. 9 illustrates another preferred embodiment of the present invention wherein the apparatus is used in a network environment.

While a preferred embodiment of the present invention has been described as operating as a stand-alone system, it is important to note that the apparatus and method of the preferred embodiments of the present invention may also be employed in a network environment. FIG. 9 illustrates another preferred embodiment of the apparatus of the present invention wherein the apparatus is utilized in a network environment. The apparatus or system of FIG. 9 is designated by the reference numeral 100.

In FIG. 9, the system 100 comprises a server computer 110 which services any number of stand-alone systems which are located remotely therefrom. The system 100 further comprises at least one remotely located apparatus 120. With reference to FIG. 9, the apparatus 120 comprises a central processing unit (CPU) 122 which provides control over the apparatus 120. The CPU 122 in this preferred embodiment is preferably a microprocessor. However, it is important to note that the CPU 122 may also be implemented with a mini-computer, a micro-computer, a workstation or a mainframe computer.

The apparatus 120 also comprises a read only memory (ROM) device 123 and a random access memory (RAM) device 124 which are connected to the CPU 122 and which store the data necessary for the operation of the apparatus 120 as is similar to the apparatus of FIG. 1. The apparatus 120 also comprises a user input device 125 for facilitating the input of data and/or commands. The apparatus 120 also preferably includes a display device 126 for providing a visual display of the status of operation and data to a user. The ROM 123, RAM 124, user input device 125 and display device 126 are operatively connected to the CPU 122. The apparatus 120 also comprises a database 127 which comprises all pertinent data and/or information necessary for system operation including proprietary software which is executed on CPU 122.

The system 100 of FIG. 9 also comprises, in the preferred embodiment, a card reader 128. The card reader 128 is operatively connected to and controlled by the CPU 122. The card reader 128 is preferably adapted to read the interrogatable cards. In this preferred embodiment, the card reader 128 preferably is a publicly accessible card reader. The card reader 128 is preferably a "contactless" card reader thereby providing an optimal public interface. The apparatus 120 of system 100 may also comprise an output device 129 which is connected to the CPU 122 and which in this preferred embodiment is preferably a printer for obtaining a printed copy of information from the apparatus 120.

In FIG. 9, the server computer 110 comprises a central processing unit (CPU) 112 which provides control over the server 110. The CPU 112, in this preferred embodiment, is a microprocessor. However, it is important to note that the CPU 112 may also be implemented with a mini-computer, a micro-computer, a workstation or a mainframe computer.

The server 110 also comprises a read only memory (ROM) device 113 and a random access memory (RAM) device 114 which are connected to the CPU 112 and which store the data necessary for system operation. The server 110 also comprises a user input device 115 for facilitating the input of data and/or commands. The server 110 also comprises a display device 116, for providing a visual display of the status of operation to a user. The ROM 113, RAM 114, user input device 115 and display device 116 are operatively connected to the CPU 112. The server 110 also comprises a database 117 which comprises all pertinent information needed for operation of the system 100 including the proprietary software required for operation thereof.

The server 110 also comprises, in this preferred embodiment, a card reader 118 which is operatively connected to and controlled by the CPU 112. The card reader 118 is adapted read enabling cards. It is also important to note that an enabling module or card may reside inside the card reader 118 in the form of data stored on silicon memory device for example so as to be a permanent fixture therein. It is also important to note that the enabling card could also be implemented as a computer chip or unit of hardware which is connected to, hard-wired to, and/or soldered to, the card reader or analogous device.

The server 110 may also comprise an output device 119, which is connected to the CPU 112 and which, in this preferred embodiment, is preferably a printer for obtaining a printed copy of information from the server 110.

In the apparatus of FIG. 9, data and information from the card reader 128 can be transmitted to the server 110 via the CPU 122 of the apparatus 120. similarly, data and information, as well as commands may be transmitted from the server 110, and in particular the CPU 112, to the apparatus 120 and, in particular, to the CPU 122 so that the server 110 can transmit data and/or information, as well as commands, to the CPU 122, thereby exercising control over the card reader 128 and the apparatus 120.

In the network environment of FIG. 9, the system 100 operates in a manner analogous to the apparatus 1 of FIG. 1, albeit, from a remote location. In this manner, the system 100, which may be equipped with a centralized database of data and/or information, may service any number of remote apparatuses, from a remote location and over a suitable communications network. In this regard, for example, the system 100 may be utilized for identifying and verifying data and/or information by accessing and utilizing a central database which is located remotely from the apparatus 120.

The network over which the apparatus 100 may be utilized may be a local area network (LAN) or a wide area network (WAN). The network of FIG. 9 may be implemented by any suitable communication network and/or system.

As is readily understood, the system 100 of FIG. 9 can be utilized in same way as the system described in FIG. 1. However, the access to the data and permissions and data operations and communication will be conducted via the network between the remote apparatus 120 and the server 110 instead of the local data communication performed in the system of FIG. 1.

The apparatus 1 and the network system 100, can be utilized in any number of ways to provide access to secured data and/or information and/or to prevent unauthorized access to data and/or information. In an alternate preferred embodiment, the system 1 or the apparatus 100 may be utilized in an automated teller machine (ATM) system so as to provide secured financial transactions.

Figure 10:
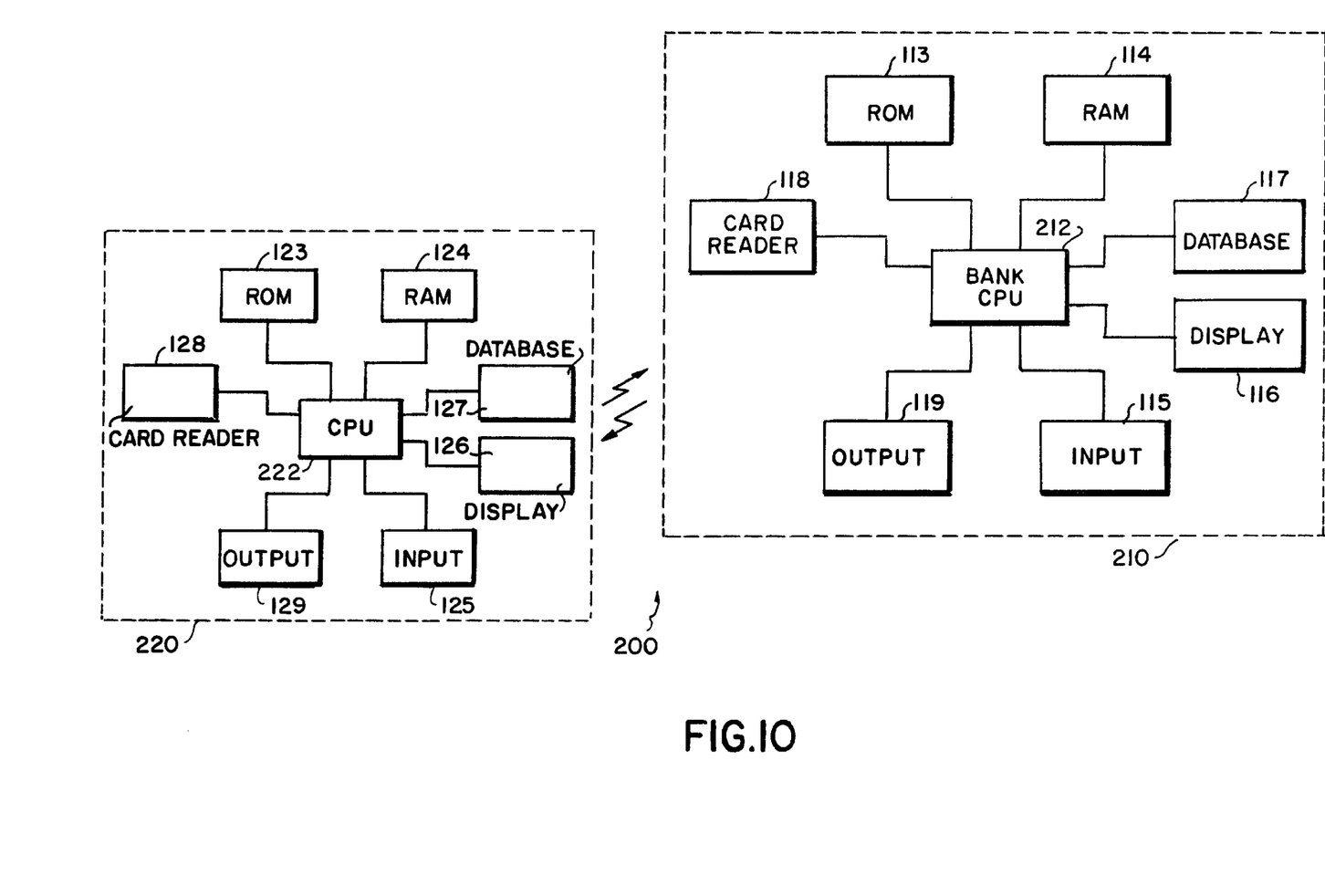
FIG. 10 illustrates a further preferred embodiment of the apparatus of the present invention wherein the apparatus is utilized in conjunction with an ATM system.

FIG. 10 illustrates an another preferred embodiment of the present invention wherein the system 200 is utilized in an automated teller machine (ATM) system. It is important to note that the apparatus 1 can also be utilized in conjunction with an ATM system. In FIG. 10, the server 110 of FIG. 9 is replaced with a bank central processing computer 210. Further, the apparatus 120 of FIG. 9 is replaced by the ATM machine 220. The interrogated card 50 is implemented with the individual's bank card or ATM card. As shown in FIG. 10, the apparatus 200 also comprises all of the components of the system 100 of FIG. 9 which are shown and which are designated by the same reference numerals. The system 200 is utilized in the manner described in conjunction with the apparatus 100 of FIG. 9 in order to provide secured access to banking and financial accounts.

It is important to note that a proposed scheme places no restriction on the nature of the data which is stored in the data cards. Capacity is only limited by the current state of technology. Data compression techniques, known by those skilled in the art, may also be utilized so as to increase the memory capacity of the data cards. In cases where data compression is utilized, the data must be decompressed as needed. Data may be stored verbatim, or in some other manner, on the data cards.

The present invention may also be utilized in conventional face to face local identity environments. The present invention may also be utilized in remote user identification applications.

There is also a potential use for the present invention in remote user identification applications within a network wherein a large number of interrogated cards share usage of only a few enabling cards.

Once documents are authenticated, the apparatus of the preferred embodiments of the present invention can be utilized so as to store certain information which relates to the individual holding the interrogated card. This information can include a password or a form of biometrics data such as, for example, finger print data, retinal scan data, a photograph, etc. The present invention can also be utilized so as to protect against forged or misused documents.

The apparatus and method of the preferred embodiments of the present invention provides many advantages to a data card scheme designer. These include a high degree of security and the capability to customize virtually every aspect of a scheme from the management level down to the bit communication level.

The apparatus and method of the preferred embodiments of the present invention may be utilized in virtually any application which utilizes data and/or information, which by the nature of the application, must create a secured access environment. In this regard, the present invention may be utilized in applications which include passport administration and monitoring, identification cards and their applications, visa and/or driving license administration and/or monitoring, vehicle driving records administration, immigration records and their administration, and further, in conjunction with DSS, medical cards, banking and financial records and their administration and monitoring. In fact, the present invention may be utilized in any application where permanent personal, visual, or non-visual records, data and/or information are kept or maintained.

While the present invention has been described and illustrated in various preferred and alternate embodiments, such are merely illustrative of the present invention and are not to be construed to be limitations thereof. In this regard, the present invention encompasses all variations, modifications and/or alternate embodiments with the scope of the present invention limited only by the claims which follow.

What is claimed is:

1. An apparatus for providing access to secured data, which comprises:

a central processing device ("CPD") for controlling the operation of said apparatus;

a first device coupled to said CPD for receiving a first data set of information from an enabling secure data module ("SDM"), said first data set including at least one decryption key; and a second device coupled to said CPD for receiving a second data set of information from, an interrogatable SDM, said second data set including encrypted biometrics data for the holder of said interrogatable SDM;

wherein said central processing device controls an operation of at least one of said first data receiving device and said second data receiving device; wherein said CPD provides a query to said enabling SDM in order to request an authorization from said enabling SDM to access said second data set of information from said interrogatable SDM; and further wherein said enabling SDM provides said at least one decryption key for decryption of said encrypted biometrics data.

2. The apparatus of claim 1, which further comprises:
contact communication means for connecting said enabling SDM with said first data receiving device.

3. The apparatus of claim 1, which further comprises:
contactless communication means for coupling said interrogatable SDM with said second data receiving device.

4. The apparatus of claim 1, wherein said first data set of information is organized in a hierarchical manner.

5. The apparatus of claim 1, wherein said interrogatable SDM is embodied in a data card.

6. The apparatus of claim 5, wherein said second data receiving device is a card reader.

7. The apparatus of claim 1, which further comprises:
a data input device associated with said central processing device; and
a data output device associated with said central processing device.

8. The apparatus of claim 1, which further comprises:
a display device associated with said central processing device.

9. The apparatus of claim 1, wherein said second data set of information is organized in a hierarchical manner.

10. The apparatus of claim 1, wherein said enabling SDM is embodied in a data card.

11. The apparatus of claim 1, wherein said first data receiving device is a card reader.

* * * * *